United States Patent
Broden

(10) Patent No.: US 7,373,831 B2
(45) Date of Patent: May 20, 2008

(54) HIGH TEMPERATURE PRESSURE TRANSMITTER ASSEMBLY

(75) Inventor: David A. Broden, Andover, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/387,675

(22) Filed: Mar. 23, 2006

(65) Prior Publication Data

US 2006/0162459 A1 Jul. 27, 2006

Related U.S. Application Data

(63) Continuation-in-part of application No. 10/876,816, filed on Jun. 25, 2004, now Pat. No. 7,036,381.

(51) Int. Cl.
*G01L 7/08* (2006.01)
(52) U.S. Cl. .............................. 73/715; 73/716; 73/753
(58) Field of Classification Search .......... 73/700–756; 361/283.1–283.4
See application file for complete search history.

(56) References Cited

U.S. PATENT DOCUMENTS

| 4,720,999 A * | 1/1988 | Olson ........................... 73/706 |
| 4,833,922 A | 5/1989 | Frick et al. .................... 73/756 |
| 4,862,317 A * | 8/1989 | Kuisma .................... 361/283.1 |
| 4,970,898 A | 11/1990 | Walish et al. ................... 73/756 |
| 5,094,109 A | 3/1992 | Dean et al. .................... 73/718 |
| 5,524,492 A * | 6/1996 | Frick et al. .................... 73/706 |
| 5,668,322 A | 9/1997 | Broden ......................... 73/756 |
| 5,731,522 A * | 3/1998 | Sittler .......................... 73/708 |
| 5,760,310 A * | 6/1998 | Rud et al. ..................... 73/706 |
| 5,920,016 A | 7/1999 | Broden ......................... 73/756 |
| 5,939,639 A * | 8/1999 | Lethbridge .................... 73/724 |
| 6,059,254 A | 5/2000 | Sundet et al. ............... 248/678 |
| 6,079,276 A * | 6/2000 | Frick et al. ................... 73/718 |
| 6,089,097 A * | 7/2000 | Frick et al. ................... 73/718 |
| 6,484,585 B1 | 11/2002 | Sittler et al. .................. 73/718 |
| 6,510,740 B1 * | 1/2003 | Behm et al. .................. 73/708 |
| 6,539,808 B2 | 4/2003 | Saenz et al. .................. 73/756 |

(Continued)

FOREIGN PATENT DOCUMENTS

EP 0 306 189 A2 8/1988

(Continued)

OTHER PUBLICATIONS

International Search Report and Written Opinion from Application No. PCT/US2005/021151 with international filing date of Jun. 15, 2005.

(Continued)

*Primary Examiner*—Andre J. Allen
*Assistant Examiner*—Jermaine Jenkins
(74) *Attorney, Agent, or Firm*—Westman, Champlin & Kelly, P.A.

(57) ABSTRACT

A pressure transmitter assembly for measuring a pressure of a process fluid includes an isolation diaphragm assembly configured to couple to a process fluid. A pressure sensor is coupled to the isolation diaphragm assembly and is configured to sense a pressure. An isolation diaphragm coupling flange is provided to carry the isolation diaphragm assembly and includes a cutaway portion to provide thermal isolation.

20 Claims, 7 Drawing Sheets

U.S. PATENT DOCUMENTS

| | | |
|---|---|---|
| 6,561,038 B2 | 5/2003 | Gravel et al. ............... 73/729.2 |
| 6,675,655 B2 | 1/2004 | Broden et al. ................ 73/716 |
| 6,883,380 B2 * | 4/2005 | Romo ....................... 73/729.2 |
| 7,036,381 B2 | 5/2006 | Broden ......................... 73/708 |
| 2005/0284227 A1 | 12/2005 | Broden et al. ................ 73/708 |
| 2006/0206288 A1 | 9/2006 | Brahmajosyula et al. ... 702/183 |

FOREIGN PATENT DOCUMENTS

| | | |
|---|---|---|
| EP | 1 126 260 A1 | 8/2001 |
| EP | 1 255 099 A2 | 11/2002 |
| EP | 1 505 378 A1 | 2/2005 |
| JP | 11094671 | 4/1999 |
| WO | WO 96/27124 | 9/1996 |
| WO | WO 98/44326 | 10/1998 |
| WO | WO 2004/097361 | 11/2004 |

OTHER PUBLICATIONS

International Search Report and Written Opinion for Application No. PCT/US2007/005987.

* cited by examiner

ововhigh temperature pressure
HIGH TEMPERATURE PRESSURE TRANSMITTER ASSEMBLY

BACKGROUND OF THE INVENTION

The present application is a Continuation-in-Part of and claims priority of U.S. patent application Ser. No. 10/876,816, filed Jun. 25, 2004, the content of which is hereby incorporated by reference in its entirety.

The present invention relates to process control transmitters of the type used in industrial process monitoring and control systems. More specifically, the present invention relates to transmitters which measure process variables in high temperature environments.

Process monitoring and control systems are used to monitor and control operation of industrial processes. Industrial processes are used in manufacturing to produce various products such as refined oil, pharmaceuticals, paper, foods, etc. In large scale implementations, these processes must be monitored and controlled in order to operate within the desired parameters.

"Transmitter" has become a term which is used to describe the devices which couple to the process equipment and are used to sense a process variable. Example process variables include pressure, temperature, flow, and others. Frequently, a transmitter is located at a remote location (i.e., in the "field"), and transmits the sensed process variable back to a centrally located control room. Various techniques are used for transmitting the process variable including both wired and wireless communications. One common wired communication technique uses what is known as a two wire process control loop in which a single pair of wires is used to both carry information as well as provide power to the transmitter. One well established technique for transmitting information is by controlling the current level through the process control loop between 4 mA and 20 mA. The value of the current within the 4-20 mA range can be mapped to corresponding values of the process variable. Other communication protocols include the HART® communication protocol in which a digital signal is modulated on top of a 4-20 mA communication current analog signal, a Fieldbus protocol in which all communications are carried out digitally, wireless protocols, etc.

One type of transmitter is a pressure transmitter. In general, a pressure, transmitter is any type of a transmitter which measures a pressure of a fluid of the process. (The term fluid includes both gas and liquids and their combination.) Pressure transmitters can be used to measure pressures directly including differential, absolute or gauge pressures. Further, using known techniques, pressure transmitters can be used to measure flows of the process fluid based upon a pressure differential in the process fluid between two locations.

Typically, a pressure transmitter includes a pressure sensor which couples to the pressure of the process fluid through an isolation system. The isolating system can comprise, for example, a isolation diaphragm which is in physical contact with the process fluid and an isolation fill fluid which extends between the isolation diaphragm and the pressure sensor. The fill fluid preferably comprises a substantially incompressible fluid such as oil. As the process fluid exerts a pressure on the isolation diaphragm, changes in the applied pressure are conveyed across the diaphragm, through the isolation fluid and to the pressure sensor. Such isolation systems prevent the delicate components of the pressure sensor from being directly exposed to the process fluid.

In some process environments, the process fluid may experience relatively high temperatures. However, typically transmitters have a maximum operating temperature of 250-300° F. Even in cases where the transmitter can withstand the high temperature, temperature extremes can still cause errors in pressure measurements. In processes which have temperatures which exceed the maximum temperature of the pressure transmitter, the transmitter itself must be located remotely from the process fluid and coupled to the process fluid using a long capillary tube. The capillary tube can run many feet and an isolation fluid is carried in tube. One end of the tube mounts to the process through an isolation diaphragm and the other end of the tube couples to the pressure transmitter. This long capillary tube and isolation diaphragm is generally referred to as a "remote seal."

The introduction of the remote seal configuration increases the cost and complexity of the installation and reduces the accuracy of the pressure measurements. Further, the additional components provide another source of possible failure of the device.

SUMMARY

A pressure transmitter assembly for measuring a pressure of a process fluid includes an isolation diaphragm assembly and a pressure sensor. An isolation diaphragm coupling flange carries the isolation diaphragm assembly and includes a cutaway portion to provide thermal isolation.

BRIEF DESCRIPTION OF THE DRAWINGS

FIG. 6A is directed to a prior art configuration and FIG. 6B is directed to a configuration in accordance with the invention.

DETAILED DESCRIPTION

Figure 1:
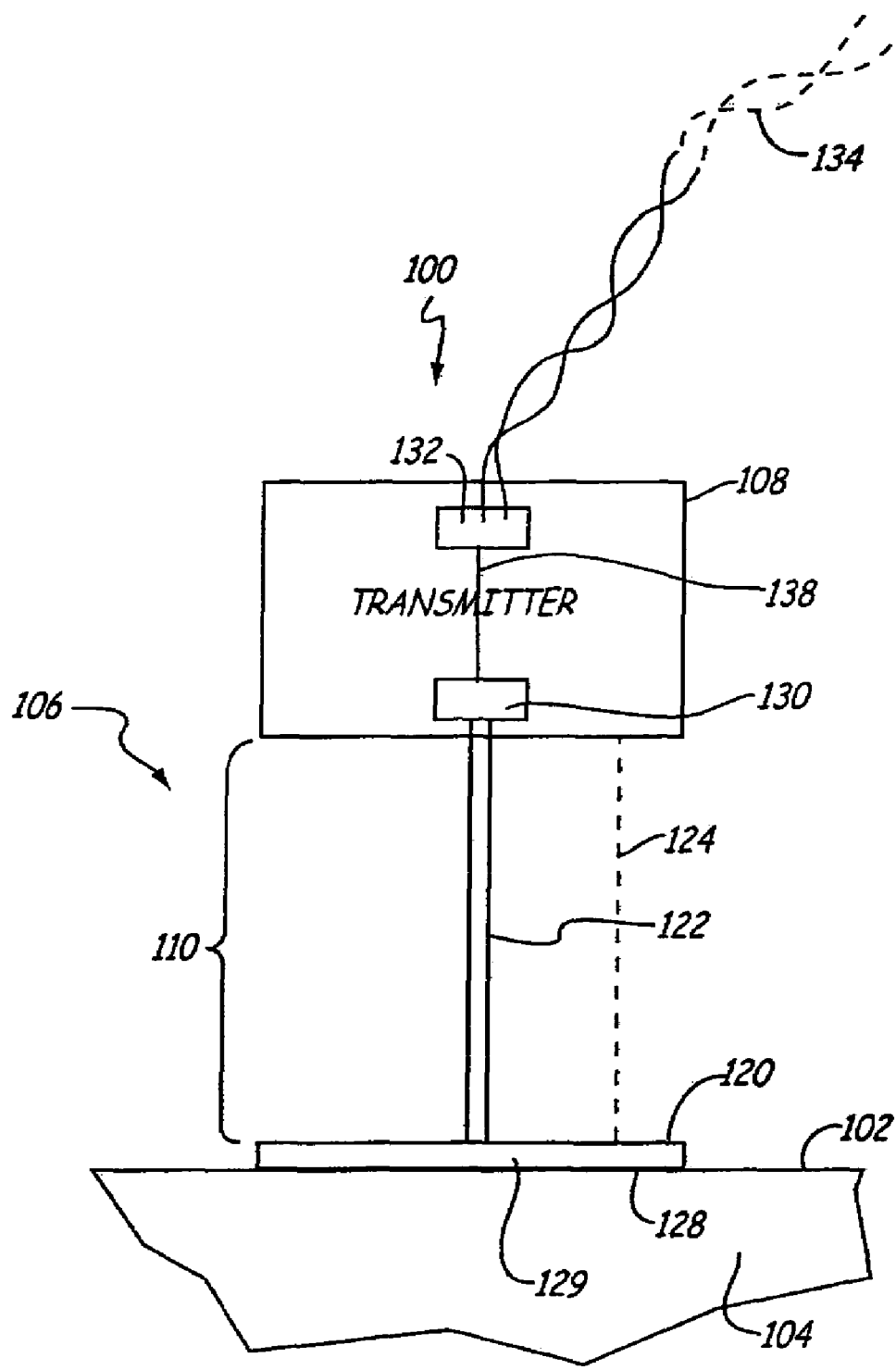
FIG. 1 is a diagram showing a pressure transmitter assembly in which a pressure sensor is spaced apart from an isolation diaphragm assembly to provide thermal isolation.

The present invention is directed to industrial transmitters of type used to measure a process variable of a process fluid in which the process fluid and/or process environment are at a relatively high temperature. With the present invention, the pressure sensor and transmitter electronics are spaced apart from the process fluid to provide thermal isolation from the process fluid. However, the configuration of the present invention does not require the remote seal technique discussed in the background section. Temperature compensation can also be employed.

Electronic industrial pressure transmitters which are employed in the process industry such as pharmaceutical, biotechnology, food and beverage technologies and others, often have special requirements. For example, they may often be required to measure the pressure of process fluid at very high temperatures. They are often required to survive very high temperatures during cleaning processes which occur between both "batches" of processing. The cleaning processes are referred to as "Clean In Place" (CIP) and/or "Sterilize In Place" (SIP). These processes expose process interfaces to temperatures of over 200° C. Further, it is desirable that the pressure measurement transmitter not only survive the cleaning process, but also provide minimal error during and after the cleaning process. This allows the next "batch" to begin processing as soon as possible. If the errors are present during the cleaning process, then it is desirable that the measurement device return to its calibration parameters quickly and without a shift in the output following the cleaning process.

Conventional industrial pressure transmitter are capable of surviving and performing nominally at temperatures of up to about 85° C. However, beyond this temperature, substantial errors and/or complete failure of the device may occur, for example due to overheating of electronic components. As discussed in the Background section, remote seals (secondary fill systems, also referred to as chemical seals) can be used to meet the needs of high temperature process environments. These seals can often survive temperatures beyond 200° C. However, such configurations have a number of drawbacks. For example, substantial measurement errors may be associated with increased process temperature, as much as 1-5%. Further, the configuration may lead to poor temperature transient behavior, i.e., large errors and slow recovery. The configuration also introduces drift and non-repeatable errors when returning from high temperature cleaning to the baseline operating temperature. They may also not be able to accurately measure pressure during the cleaning process.

The industrial pressure transmitter of the present invention provides improved performance in high temperature processes, and in processes which experience intermittent high temperatures such as those experienced during tank cleaning (CIP and SIP). The configuration is well suited to pressure measurement in a hygienic manner as employed in biotechnology, pharmacology, food and beverage processes. The improvements include the increased high process temperature capability and reliability, reduced errors during measurement while under high process temperatures, reduced errors when returning to normal operation from high temperatures, and improved speed of return from transient temperatures induced during CIP and SIP.

FIG. 1 is a simplified diagram of an industrial process installation 100 which illustrates a pressure transmitter assembly 106 in accordance with the present invention. Process 100 includes a vessel 102 which contains a process fluid 104 therein. The transmitter assembly 106 includes a transmitter offset assembly 110 which mounts transmitter (transmitter module) 108 to vessel 102. Although the transmitter offset assembly 110 is illustrated as a separate component, it may be a component which is integral with the transmitter 108. Offset assembly 110 includes an isolation diaphragm assembly 120, a conduit 122 and a transmitter support 124. The isolation diaphragm assembly 120 includes an isolation diaphragm 128 which has a process interface side which faces and contacts the process fluid 104. An isolated cavity 129 is defined behind the isolation diaphragm 128 and opposite its process interface side. The capillary 122 couples to this cavity 129 and the cavity 129 and capillary 122 are filled with an isolation fill fluid. The isolation fill fluid is of a substantially incompressible liquid such as oil. The end of the capillary 122 which is opposite the isolation diaphragm assembly 120 couples to a pressure sensor 130. The pressure sensor provides an output to transmitter circuitry 132. Transmitter circuitry 132 is illustrated as coupled to a two wire process control loop 134. The pressure sensor 130 is electrically coupled to transmitter electronics 132 by electrical connection 138. In one specific embodiment, electrical connection 138 comprises a flex circuit.

The isolation diaphragm assembly 120 can be of any configuration and the diagram in FIG. 1 is provided for illustration purposes only. Similarly, the conduit 122, transmitter 108, pressure sensor 130 and transmitter electronics 132 can be of any desired configuration. The conduit 122 does not need to be straight or tubular as illustrated in FIG. 1 and any number of conduits may be employed in alternative configurations.

The transmitter support 124 physically mounts the transmitter 108 to the isolation diaphragm assembly 122 with a spaced apart orientation. Any desired transmitter support or configuration can be used. One example support 124 is one which completely encloses conduit 122 to protect the conduit 122 from the process environment. Another example transmitter support divides the space between vessel 102 and transmitter 108 to create a baffle to reduce or reflect radiation. The spacing between the process vessel 102 and the transmitter 108 provided by the offset assembly 110 provides thermal isolation therebetween. The thermal isolation can be achieved using materials with good insulation properties, through the use of an air gap, or through other techniques. The separation distance between the transmitter 108 and the process vessel 102 can be selected based upon the desired amount of thermal isolation for a particular installation. Increased spacing can be used in installations which have particularly hot process temperatures or with transmitters which include electronics or other components which are particularly sensitive to temperature extremes. Unlike the remote seal configuration used in the prior art, the pressure transmitter assembly 106 of the present invention provides a unitary assembly which can be mounted to a process vessel 102 using conventional techniques for mounting a pressure transmitter to a process vessel.

Figure 2:
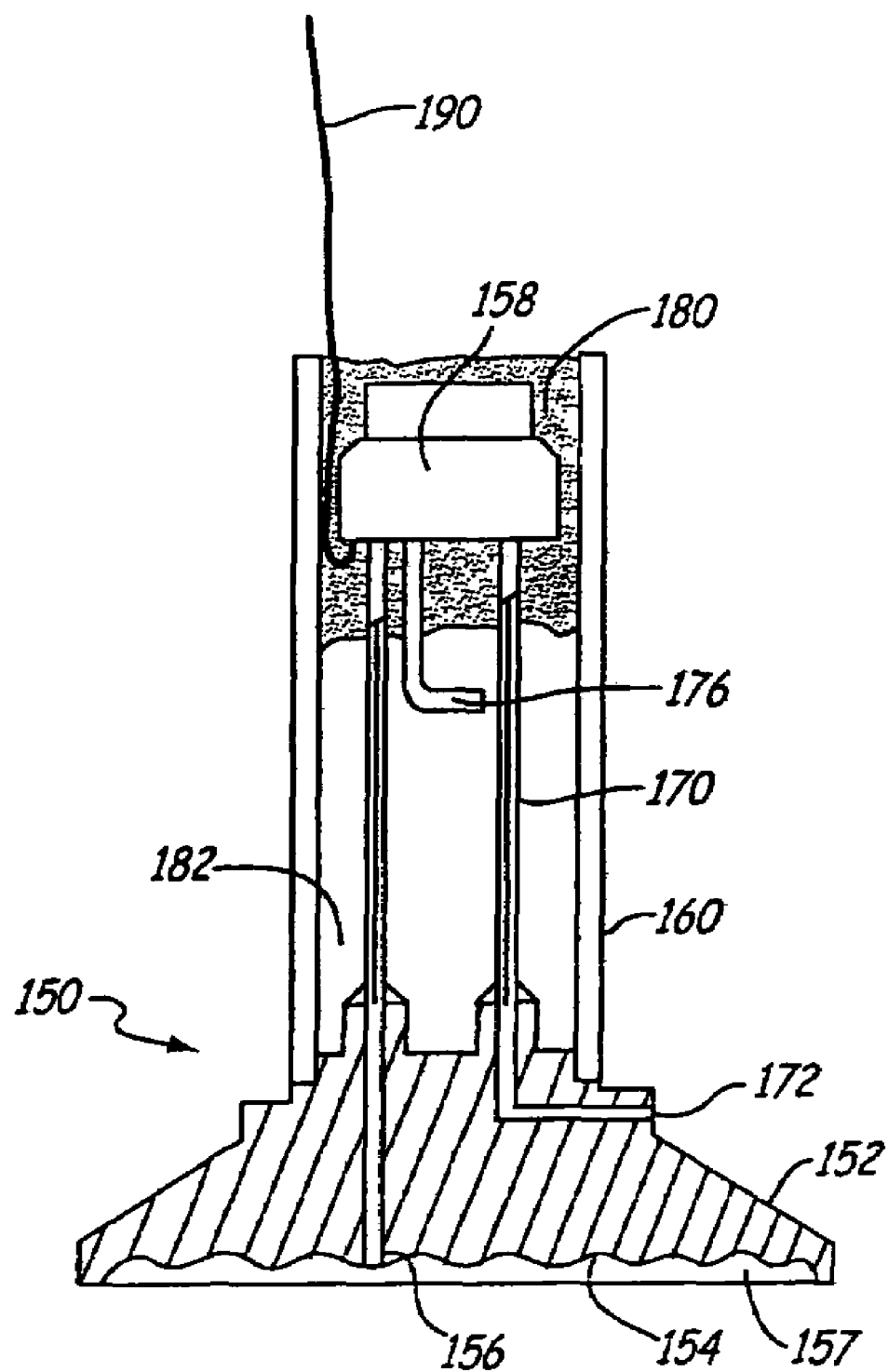
FIG. 2 is a cross-sectional view of a process transmitter offset assembly.

FIG. 2 is a cross-sectional view of a process transmitter offset assembly 150 in accordance with another example embodiment. Assembly 150 includes isolation diaphragm assembly 152 having an isolation diaphragm 154 which forms a cavity 157. A pressure conduit 156 extends from the circuitry 157 to a pressure sensor module 158. In the configuration of FIG. 2, a vent pressure conduit 170 also extends from sensor module 158 to a vent port 172 and the isolation diaphragm assembly 152. A fill fluid conduit 176 is provided for filling the conduit 156 with fill fluid. A transmitter support 160 surrounds the conduits 156 and 170 and supports the pressure sensor module 158. In the configuration of FIG. 2, the transmitter support 160 has a tubular shape, however, any shape can be used. The tube 160 can be formed of any appropriate material. In one specific embodiment, the tube 160 is formed of a relatively thin wall of a high temperature plastic. The pressure sensor module 158 is mounted in the support 160 using a potting compound 180. An air gap 182 provides thermal isolation between the isolation diaphragm assembly 152 and the pressure sensor module 158. An electrical connection 190 couples to transmitter electronics which are not shown in FIG. 2. The electrical connection 190 can comprise, for example, a flex circuit. The pressure sensor module 158 may contain a temperature sensor (discussed below in greater detail) used for compensating pressure sensor measurements. The potting material 180 provides support structure for the module 158 and may be used to meet intrinsic safety requirements. The air gap 182 may be filled with any desired material and may, for example, constitute a substantial vacuum.

Figure 3:
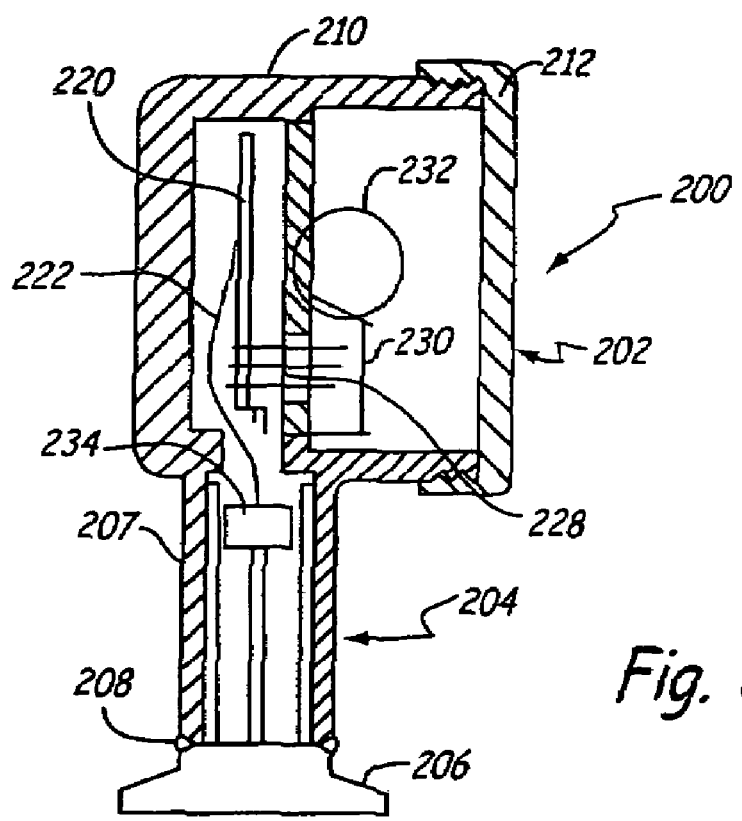
FIG. 3 is a cross-sectional view of a pressure transmitter assembly including a transmitter offset assembly.

FIG. 3 is a cross-sectional view of a pressure sensor transmitter assembly 200 in accordance with another example embodiment. In the embodiment of FIG. 3, a pressure transmitter 202 couples to an isolation diaphragm assembly 206 through an offset assembly 204. In this configuration, the offset assembly 204 includes a stainless steel housing 207 which is welded to the isolation diaphragm assembly 206 along weld 208. In the embodiment shown, housing 207 has a tubular shape and provides a transmitter support.

Transmitter 202 includes a transmitter housing 210 and a cover 212. In the configuration of FIG. 3, the housing 210 is continuous with tubular stainless steel housing 207. Transmitter electronics 220 couples to a pressure sensor 234 through flex circuit 222. Pressure sensor 234 couples to isolation diaphragm assembly 206 through fill fluid conduit 236. The transmitter electronics 220 couples to a terminal block 230 through a feedthrough 228. A field wiring inlet 232 is provided in the housing 210 for coupling to terminal block 230.

Figure 4:
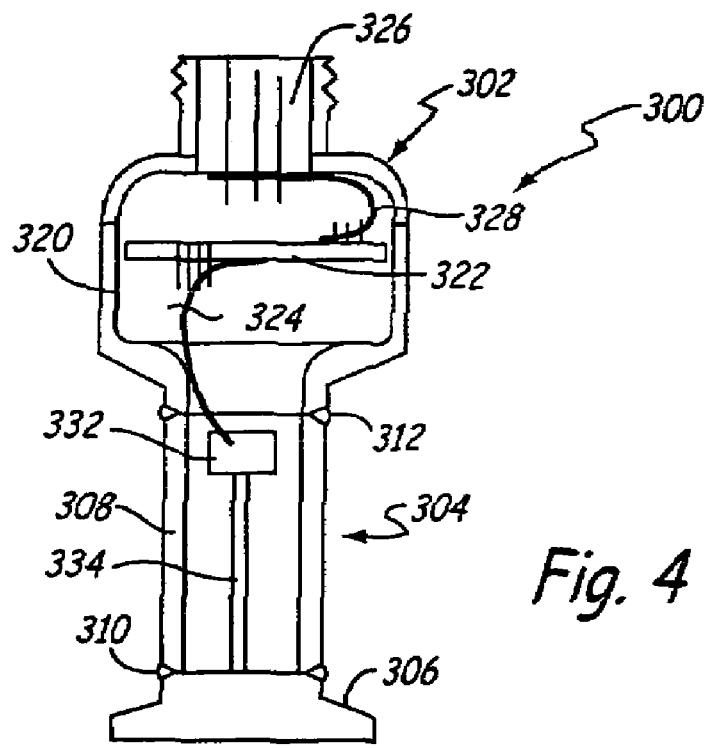
FIG. 4 is a cross-sectional view of another embodiment of a pressure transmitter assembly.

FIG. 4 is a cross-sectional view of a pressure transmitter assembly 300 in accordance with another example embodiment. Pressure transmitter assembly 300 includes pressure transmitter 302 coupled to offset assembly 304 which includes isolation diaphragm assembly 306. Offset assembly 304 includes a transmitter support 308 which couples to isolation diaphragm assembly 306 at weld 310. Support 308 couples to transmitter body 320 along weld 312. Transmitter circuitry 322 carried within transmitter body 320 couples to a pressure sensor 332 through flex cable 324. Pressure sensor 332 couples to isolation diaphragm assembly 306 through fill fluid conduit 334. Circuitry 322 couples to a connection header 326 through a flex cable 328. The header 326 can provide a connection for a two wire process control loop or other data interface.

Figure 5:
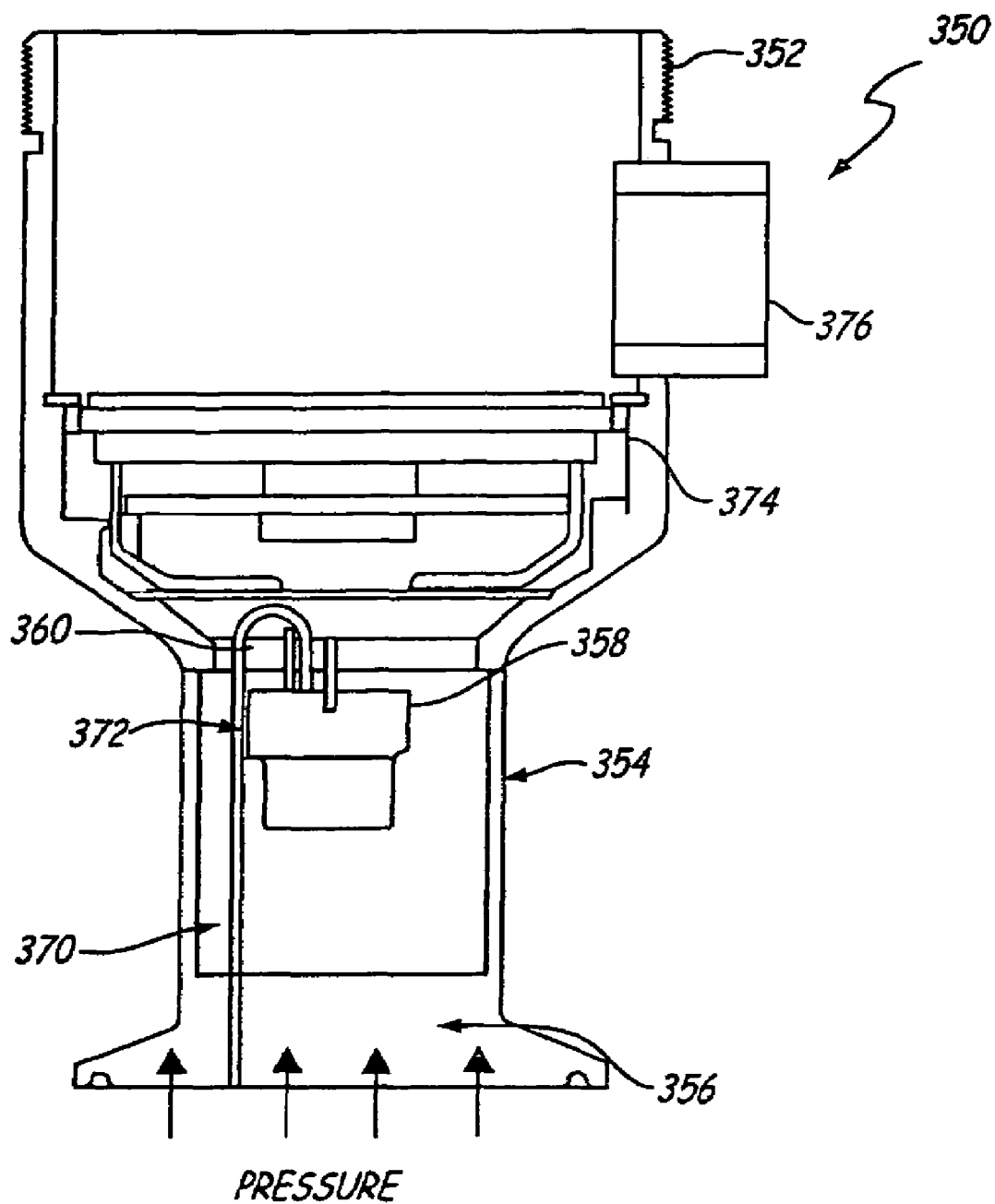
FIG. 5 is a cross-sectional view of a pressure transmitter assembly in accordance with another embodiment.

FIG. 5 is a cross-sectional view of a transmitter assembly 350 in accordance with another example embodiment. Transmitter 350 includes transmitter housing 352 having an integral transmitter offset support 354 which couples to a isolation diaphragm assembly 356. A pressure sensor 358 of the pressure transmitter includes a pressure port 360. A conduit 370 extends from the pressure port 360 to the isolation diaphragm assembly 356. An optional temperature sensor 372 is illustrated mounted on pressure sensor 358. Transmitter electrical circuitry 374 electrically couples to pressure sensor 358 and can be coupled to field wiring (not shown in FIG. 5) through field wiring port 376. The interior of integral transmitter offset support 354 provides an insulating or isolating volume which can be filled with gas, vacuum, or insulation material to provide the desired thermal isolation. Example insulating materials include RTV (Room Temperature Vulcanized), foam or other material. Such a configuration can operate with process fluids at temperatures over 200° C. while maintaining the pressure sensor 358 and transmitter electronics 374 at much cooler temperatures, for example temperatures below 85° C.

Figure 6A:
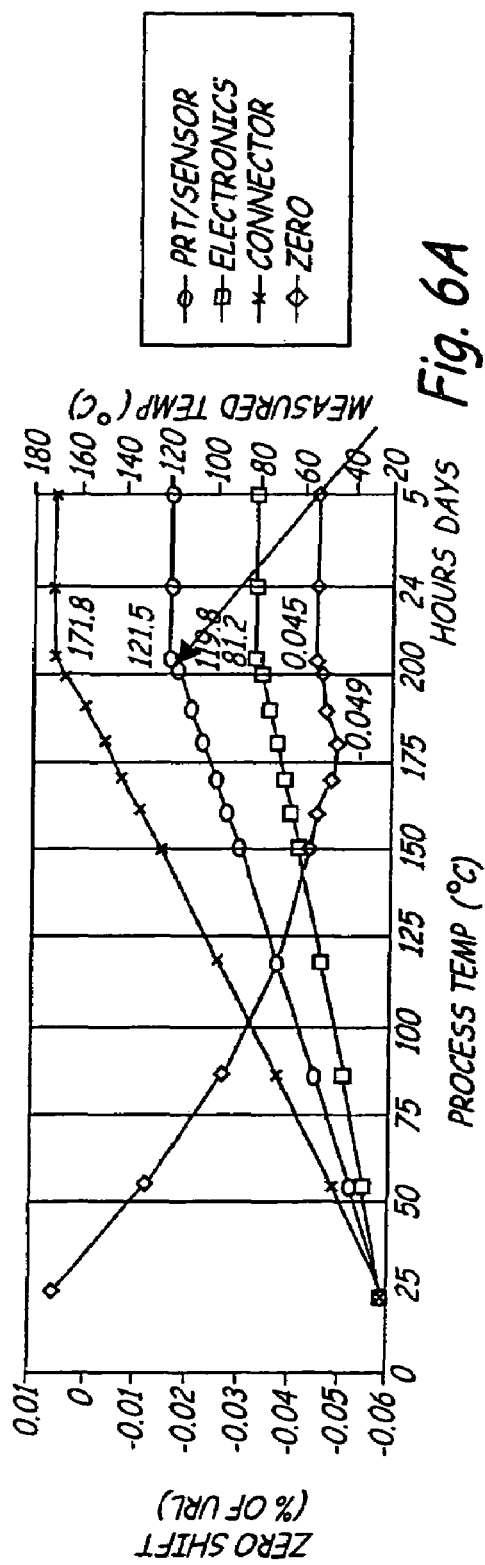
FIG. 6A and FIG. 6B are graphs which show the effect of process temperature on components of a pressure transmitter assembly.
Figure 6B:
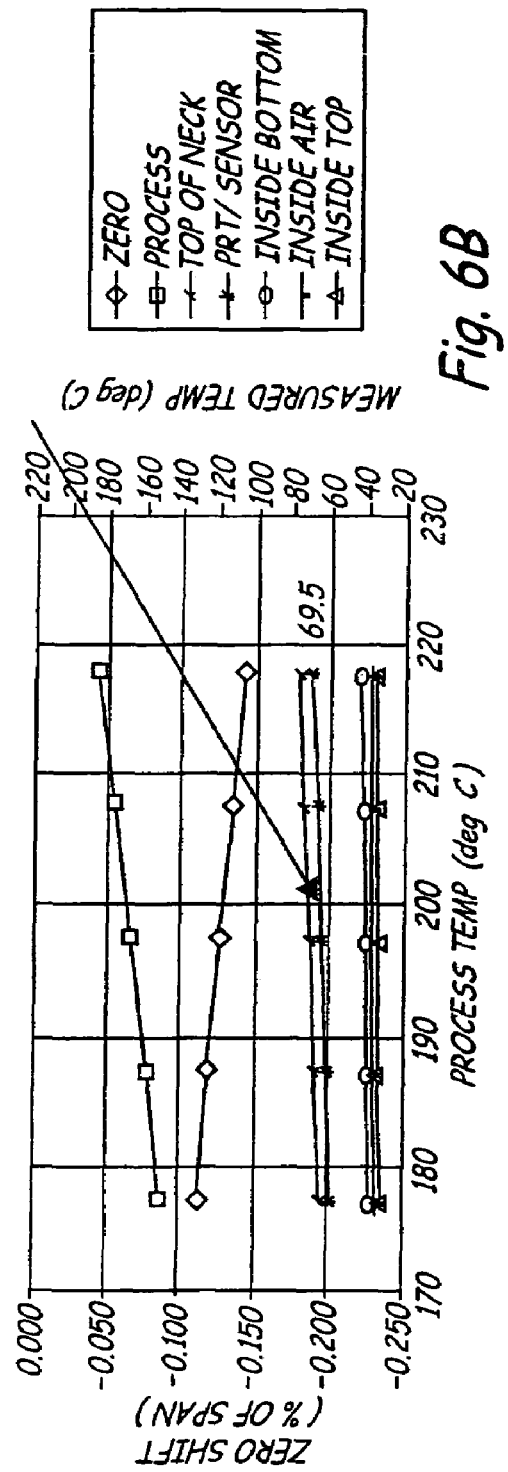

FIG. 6A is a graph which illustrates the effect of process temperature on various components of a pressure transmitter having a typical prior art configuration and FIG. 6B is a graph showing the temperature effects on a transmitter assembly in accordance with one example embodiment of the invention. FIG. 6A shows a graph of process temperature of zero shift as a percentage of the upper range limit and measured temperature of various components. The graph shows the temperatures of various components when the pressure transmitter is exposed to a range of process temperatures. The graph of the connector temperature shows the sharpest increase as that is located closest to the process. However, the PRT temperature sensor which is positioned next to the pressure sensor also rises substantially to 120° C. when the process fluid is at 200° C. Even the transmitter electronic circuitry shows an increase to more than 80° C. The effect of these temperature changes can be seen on the zero reading of the pressure transmitter as the process temperature increases. In contrast, as illustrated in FIG. 6B, when the process temperature is increased to 200° C., the pressure sensor temperature only reaches about 65° C. The other lines in FIG. 6B show temperatures of other regions of the process transmitter including the inside top region of the housing, the inside air (gap) region, the inside bottom and the neck. The zero shift as a percent of span is also illustrated as the temperature is increased.

Figure 7:
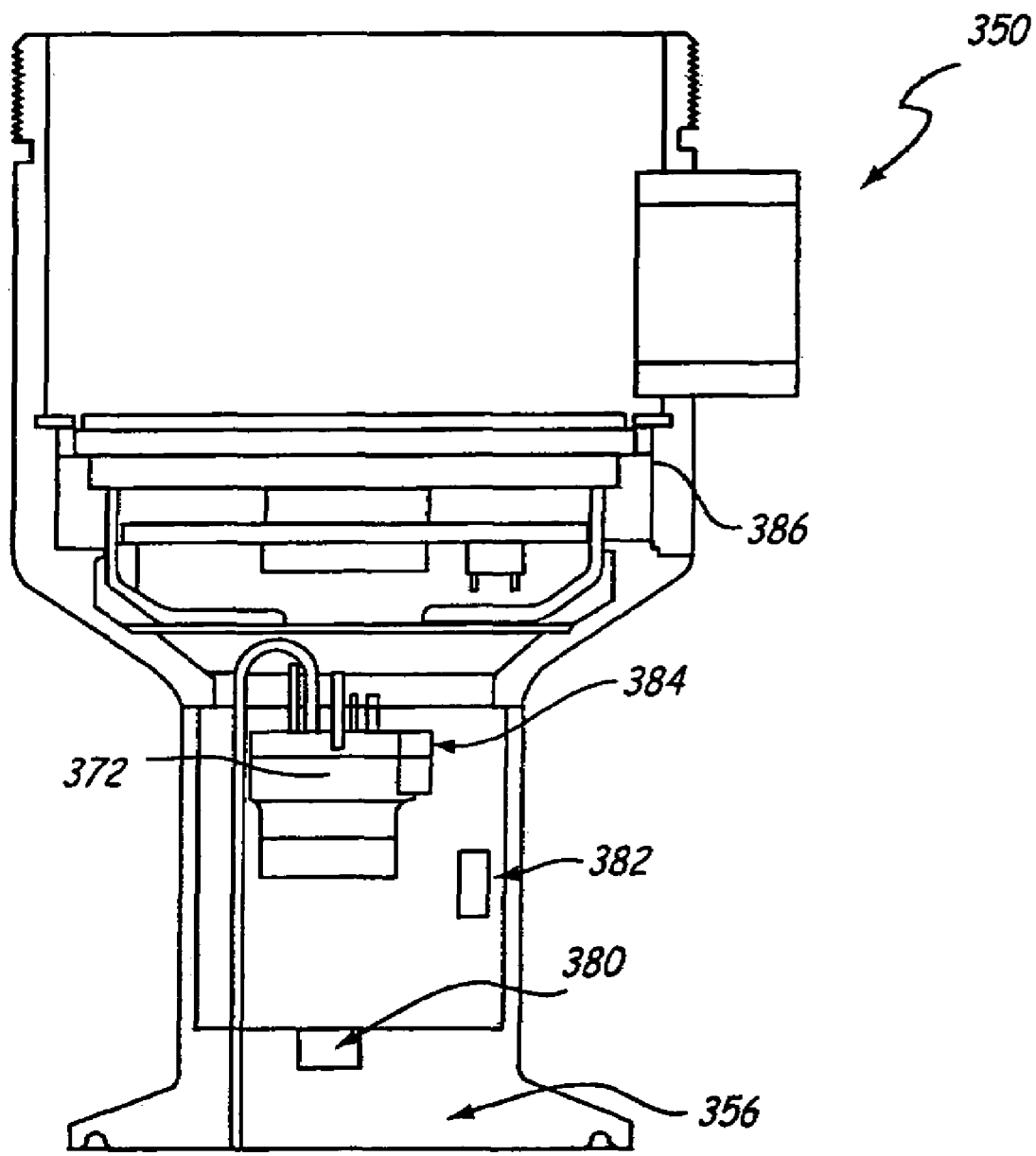
FIG. 7 is a cross-sectional view of a pressure transmitter assembly showing locations of temperature sensors for use in compensating pressure sensor measurements.

As mentioned above, in another aspect of the invention, a temperature sensor can be used to provide temperature compensation in conjunction with the temperature isolation. FIG. 7 is a cross sectional view of the pressure transmitter of FIG. 5 showing example positions of a temperature sensor in the transmitter 350. Temperature sensor 380 is positioned in the isolation diaphragm assembly, temperature sensor 382 is positioned along the transmitter support structure, temperature sensor 384 is positioned adjacent the pressure sensor and temperature sensor 386 is mounted on the transmitter electronics. These temperature sensors 380-386 are electrically coupled to circuitry in the transmitter 350 and are used to provide temperature compensation to the pressure related output provided by the transmitter. Each temperature sensor 380-386 can be used to compensate for different temperature effects on the pressure output. Although four different temperature sensors are shown, in the present invention any number of temperature sensors can be utilized at any desired position. The temperature sensors can be used to dynamically compensate the associated subsystem which they are coupled to. Particular compensation characteristics can be determined through imperial testing or modeling of the pressure transmitter system and logic and can be used to reduce transient errors. The temperature sensors can be placed at positions within the transmitter to provide compensation which is proportionate to the relative magnitude of the error due to temperature changes of components in the vicinity of the sensor.

Figure 8:
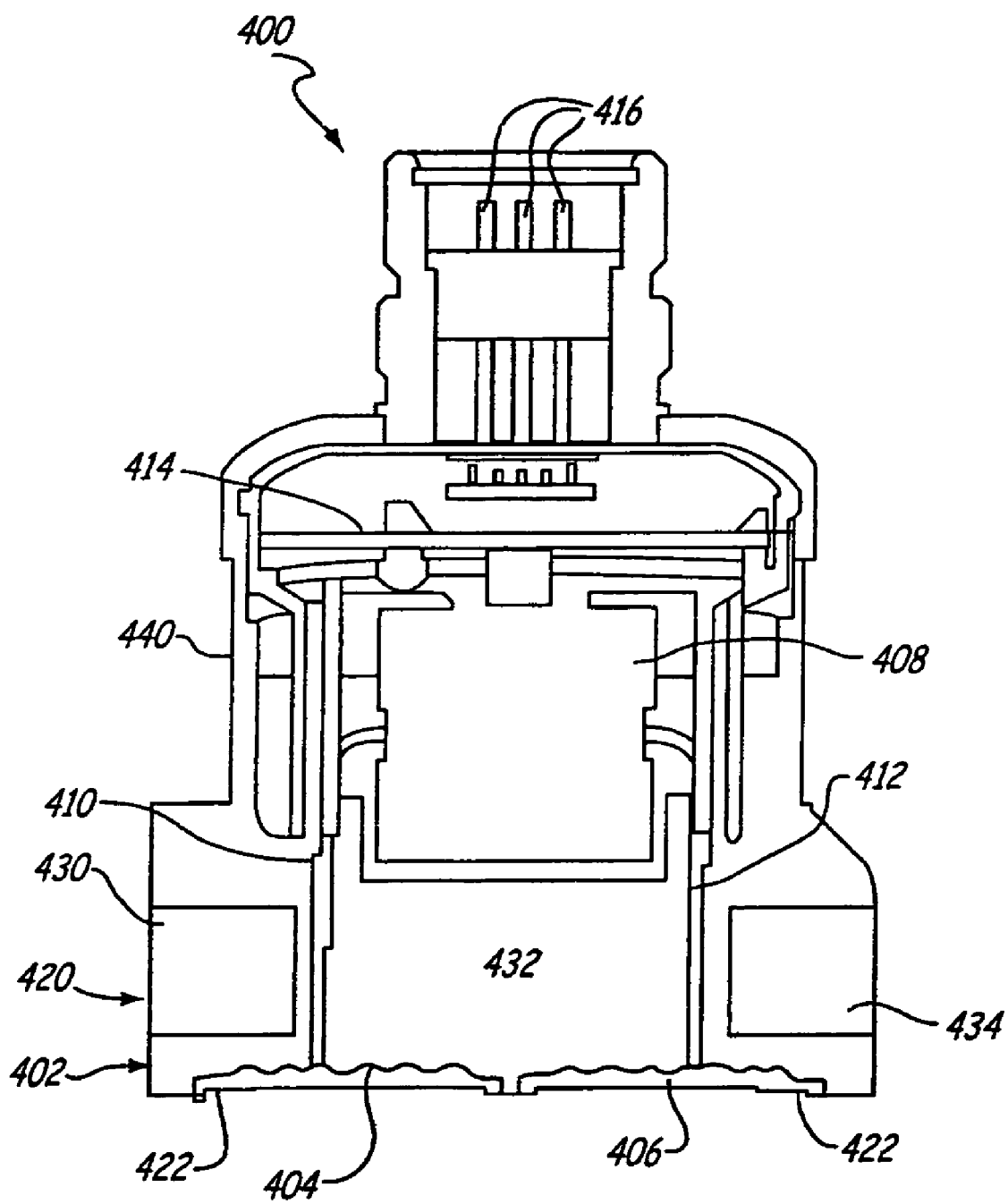
FIG. 8 is a cross-sectional view of another example embodiment including cutaway portions to provide thermal isolation.

FIG. 8 is another side cross-sectional view of a pressure transmitter assembly 400 in accordance with another example embodiment. In the configuration of FIG. 8, isolation diaphragm assembly 402 includes isolation diaphragms 404 and 406. Isolation diaphragms 402 and 406 couple to pressure sensor 408 through capillaries (conduits) 410 and 412, respectively. Pressure sensor 408 provides an electrical output to measurement circuitry 414 which provides a transmitter output connectors 416.

In the configuration of FIG. 8, diaphragm assembly 402 is supported by isolation diaphragm coupling flange 420 which is typically formed of stainless steel. Coupling flange 420 is configured to couple to a process flange (not shown) and seal diaphragms 404 and 406 with seals 422. Isolation diaphragm coupling flange 420 includes cutaway portions 430, 432 and 434. Cutaway portions 430, 432 and 434 provide thermal isolation from process fluid and the process flange (not shown). Any number of cutaway portions and configurations can be utilized. However, the remaining structure should provide sufficient strength for a specified application. In one example, the cutaway portions are air filled. However, the cutaway portions can contain any type of material including a material having low thermal conductivity. In the configuration illustrated, cutaway portion 432 extends completely through the isolation diaphragm coupling flange 420. In another configuration, a sealed cutaway portion can contain a substantial vacuum.

The isolation diaphragm coupling flange 420 can be formed from a separate component, or can be formed integrally with transmitter housing 440. In one configuration, isolation diaphragm coupling flange comprises a metal such as stainless steel. Cutaway portions 430, 432 and 434 can be formed using any appropriate technique. Examples include a material removal process such as machining, or through a molding process. In addition to providing thermal isolation, the configuration illustrated in FIG. 8 can reduce the weight of the transmitter assembly 400.

The present invention provides a technique for isolating pressure transmitters from a high temperature process connection. A unitary pressure transmitter assembly includes the pressure transmitter in a spaced-apart configuration from an isolation diaphragm assembly. This configuration allows the circuitry and pressure sensor to be operated at a cooler temperature while the process connection may be a temperature of 230° C. or greater. The modular construction allows the invention to be implemented in a wide range of applications and allows for the use of simple and low cost assembly techniques while minimizing inventory requirements. The thermal isolation can be increased by changing the materials used in the support structure and/or lengthening the support structure. Temperature sensors can be used for compensation of the measured process variable in accordance with known techniques. However, in addition to placing a temperature sensor for compensation near the pressure sensor, in one example embodiment a temperature sensor is placed near the isolation diaphragm assembly. The pressure sensor can be used to measure gauge, absolute and differential pressures. A temperature sensor can be provided on electronic circuit board for temperature compensation. The temperature sensor can be thermally coupled to the pressure sensor by a thermally conductive material for use in compensating for temperature variations.

Although the present invention has been described with reference to preferred embodiments, workers skilled in the art will recognize that changes may be made in form and detail without departing from the spirit and scope of the invention. Any type of isolation diaphragm assembly can be used and the invention is not limited to those specifically set forth herein. Similarly, other pressure transmitter configurations may be utilized. The isolation fill fluid can be of any type of configuration or shape. Any type of pressure sensor, isolation diaphragm or transmitter electronics can be employed as desired. The pressure transmitter module used in the pressure transmitter assembly used in the present invention can have an configuration and typically, although not exclusively, will include transmitter electronics and/or a pressure sensor. In one embodiment, the spacing between the isolation diaphragm and the pressure sensor is more than about 1.3 inches. In another example embodiment, the thermal conductivity as measured from the isolation diaphragm to the pressure sensor is less than about 1 W/m K. The transmitter support structure can be formed of a separate component which is mounted to the transmitter assembly module and/or the isolation diaphragm assembly, or it can be a component which is formed integrally with the pressure transmitter module and/or the isolation diaphragm assembly. The pressure sensor can be located in the transmitter module, in the transmitter support, or in another location as desired.

What is claimed is:

1. A pressure transmitter assembly for measuring a pressure of a process fluid, comprising:
    a pressure sensor;
    an isolation diaphragm assembly including an isolation diaphragm configured to couple to a process fluid along a process interface side and defining an isolated cavity opposite the process interface side;
    a conduit extending from the isolated cavity defined by the isolation diaphragm to the pressure sensor and configured to carry isolation fill fluid to thereby transfer a pressure applied to the isolation diaphragm to the pressure sensor; and
    an isolation diaphragm coupling flange configured to carry the isolation diaphragm assembly, the isolation diaphragm coupling flange having a cutaway portion to provide thermal isolation;
    wherein the cutaway portion is filled with a thermally insulating material.

2. The apparatus of claim 1 wherein the cutaway portion is formed through a material removal process.

3. The apparatus of claim 1 wherein the cutaway portion is formed through a molding process.

4. The apparatus of claim 1 including a plurality of cutaway portions.

5. The apparatus of claim 1 wherein the flange as a coupling face which carries the isolation diaphragm and a side and the cutaway portion is formed in the side of the isolation diaphragm coupling flange.

6. The apparatus of claim 1 wherein the cutaway portion extends through the isolated diaphragm coupling flange.

7. The apparatus of claim 1 wherein the cutaway portion is imbedded within the isolation diaphragm coupling flange.

8. The apparatus of claim 1 including a second isolation diaphragm assembly and a second conduit and wherein the cutaway portion is positioned between the conduits.

9. The apparatus of claim 1 wherein the isolation diaphragm assembly lies in a plane on an end portion of the isolation diaphragm coupling flange.

10. The apparatus of claim 9 including a second isolation diaphragm assembly lying substantially on the same plane as the first isolation diaphragm assembly.

11. The apparatus of claim 1 including a transmitter support which couples a transmitter module to the isolation diaphragm coupling flange and provides thermal isolation there between.

12. A method of manufacturing a pressure transmitter for coupling to a high temperature process fluid, comprising:
    providing a pressure sensor;
    providing an isolation diaphragm assembly which includes an isolation diaphragm configured to coupled to a process fluid;
    providing an isolation diaphragm coupling flange for carrying the isolation diaphragm assembly; and
    providing a cutaway portion in the isolation diaphragm coupling flange to provide thermal isolation;
    filling the cutaway portion with a thermally insulating material.

13. The method of claim 12 including forming the cutaway portion through a material removal process.

14. The method of claim 12 including forming the cutaway portion through a molding process.

15. The method of claim 12 including providing a plurality of cutaway portions.

16. The method of claim 12 wherein the cutaway portion is imbedded with the isolation diaphragm coupling flange.

17. The method of claim 12 including providing a second isolation diagram assembly and a second conduit and wherein the cutaway portion is positioned between the conduits.

18. The method of claim 12 wherein the isolation diaphragm assembly lies in a plane on an end portion of the isolation diaphragm coupling flange.

19. The method of claim 18 including providing a second isolation diaphragm assembly lying on substantially the same plane as the first isolation diaphragm assembly.

20. The method of claim 12 wherein the flange has a coupling face which carries the isolation diaphragm and a side and the cutaway portion is formed in the side of the isolation diaphragm coupling flange.

\* \* \* \* \*

UNITED STATES PATENT AND TRADEMARK OFFICE
CERTIFICATE OF CORRECTION

PATENT NO. : 7,373,831 B2 Page 1 of 1
APPLICATION NO. : 11/387675
DATED : May 20, 2008
INVENTOR(S) : David A. Broden It is certified that error appears in the above-identified patent and that said Letters Patent is hereby corrected as shown below:

Column 8, line 31:
--as-- should be "has"

Signed and Sealed this

Third Day of March, 2009

JOHN DOLL
*Acting Director of the United States Patent and Trademark Office*